United States Patent [19]

Brandon et al.

[11] Patent Number: 5,308,494

[45] Date of Patent: May 3, 1994

[54] METHOD FOR IMPROVING FILTER EFFICIENCY

[75] Inventors: Steven C. Brandon, Central, S.C.; Roy Segars, Jr., Wilmington, Del.

[73] Assignee: E. I. Du Pont de Nemours and Company, Wilmington, Del.

[21] Appl. No.: 36,562

[22] Filed: Mar. 24, 1993

[51] Int. Cl.⁵ .............................................. B01D 69/14
[52] U.S. Cl. .................................... 210/639; 210/767; 210/500.25
[58] Field of Search .................. 210/767, 634, 500.25, 210/500.26, 490; 55/16, 158; 427/244, 245, 246

[56] References Cited

U.S. PATENT DOCUMENTS

| | | | |
|---|---|---|---|
| 3,577,339 | 5/1971 | Baird et al. | 210/639 |
| 3,926,799 | 12/1975 | Thomas et al. | 210/500.25 X |
| 3,977,967 | 8/1976 | Trulson et al. | 210/639 X |
| 4,060,488 | 11/1977 | Hoover et al. | 210/433.1 |
| 4,069,157 | 1/1978 | Hoover et al. | 210/500.25 X |
| 4,088,576 | 5/1978 | Mott | 210/570 X |
| 4,762,619 | 8/1988 | Gaddis et al. | 210/639 |
| 4,888,114 | 12/1989 | Gaddis et al. | 427/190 X |
| 5,043,069 | 8/1991 | Brandon et al. | 210/500.28 X |

FOREIGN PATENT DOCUMENTS 1255268 12/1971 United Kingdom ................ 210/639

*Primary Examiner*—Frank Spear

[57] ABSTRACT

The invention is directed to a method for improving the filtration efficiency of an altered substrate filter element comprising a porous solid substrate, one side of which is impregnated with sintered solid particles, by treating the solids-oxide-impregnated side with an aqueous suspension of small non-agglomerated solid particles which are deposited upon the sintered solid particles.

9 Claims, No Drawings

METHOD FOR IMPROVING FILTER EFFICIENCY

FIELD OF INVENTION

The invention is directed to a method for improving the filtration efficiency of altered substrate filter elements.

BACKGROUND OF THE INVENTION

A significant tool in the food and chemical industries for improvement of operating efficiencies and reduction of environmentally problematic materials is the use of cross-flow filters to separate solids and semisolids from liquid media. Such devices are used for such things as recovery of spent sulfite liquor, "mud" removal from converted corn syrup, residue removal from modified starches, removal of biological contaminants from fructose corn syrup, removal of particles from caustic cleaning solutions, recovery of PVA from textile desizing processes, clarification of alcohol still bottoms and many more.

The filter elements for such filters are comprised of a plurality of porous tubular substrates having interconnected pores of a relatively large pore size. The upstream (inner) side of the tubular substrates have finer particles impregnated therein to a slight depth to form a layer having a higher degree of filtration than the unaltered tube wall. The finer particles are affixed within the pores of the tubular substrate by sintering. Such cross-flow filter elements and their manufacture are described in U.S. Pat. No. 4,888,114 to Gaddis et al. Filters of this type are often used in conjunction with a formed-in-place membrane extending over the impregnated surface by which solute/solution separations can be carried out.

In common with most filtration systems, the pores of the filtration media are subject to abrasion by the liquid being treated and to clogging by various organic materials separated from the treated slurries which are not carried through the filter with the permeate or out of the filter with the slurry concentrate. When fouling of the pores and damage to the filter medium becomes sufficiently serious to impede the efficiency of the filter, the filter element must be removed from service and the medium replaced or repaired so that the original pore characteristics are regained. To repair sintered metal oxide filter media by cleaning, redepositing additional metal oxide and firing the filter to sinter the metal oxide means that the equipment must not only be out of service for at least several days, but in some cases even weeks. For this reason, there is a substantial need for a method of rejuvenating the filtration efficiency of such altered substrate filters in place without the necessity of shutting the filter down for more than 2–3 hours.

SUMMARY OF THE INVENTION

The invention is therefore directed to a method for improving the filtration efficiency of an altered substrate filter element comprising a porous solid substrate having a pore size element comprising a porous solid substrate having a pore size of 0.5–10 micrometers, the pores in one surface of which are impregnated with sintered solids and free of foulants, comprising treating the side of the filter element containing the sintered solids with a dilute suspension of non-agglomerated finely divided solid particles dispersed in an aqueous liquid medium, the size of the non-agglomerated solid particles being no greater than the size of the impregnated sintered solids to effect separation of the finely divided solid particles from the aqueous liquid medium and deposition of the finely divided solids over the pores of the sintered solids particles to a level of 1.08–54 $g/m^2$.

Prior Art

U.S. Pat. No. 3,577,3399, Baird et al.

The Baird et al. patent is directed to a cross-flow liquid filtration method in which the liquid to be filtered is passed across a filter medium compromising a bed of fine particles dispersed on a porous substrate.

U.S. Pat. No. 3,926,799, Thomas et al.

The Thomas et al. patent is directed to a method for making a support for a dynamic hyperfiltration membrane by coating a porous substrate with a uniform layer of $TiO_2$ particles having a size of 1.5–3.0 micrometers.

U.S. Pat. No. 4,060,488, Hoover et al.

The Hoover et al. '488 patent is directed to an ultrafiltration device in which a porous substrate is coated with a porous membrane comprised of two sizes of particles, one size being capable of passing through the pores and the other size being capable of passing into, but not through, the pores.

U.S. Pat. No. 4,069,157, Hoover et al.

The Hoover et al. '157 patent is directed to an ultrafiltration device having axially parallel porous ceramic tubes coated with a porous particulate membrane.

U.S. Pat. No. 4,088,576, Mott

The Mott patent is directed to a method for making a tubular inertial filter by treating a porous substrate having large particles with a particulate slurry of nickel particles in order to clog the pores and then heat bonding (sintering) the nickel particles within the pores to provide a thin layer having a higher degree of filtration.

U.S. Pat. No. 4,762,619, Gaddis et al.

The first Gaddis et al. patent is directed to a method of making hyperfiltration elements on a porous stainless steel substrate by treating the substrate with aqueous acidic zirconium nitrate and polyacrylic acid and neutralizing acid membrane on the substrate.

U.S. Pat. No. 4,888,114, Gaddis et al.

This second Gaddis et al. patent is directed to a method for preparing a sintered coating for porous metallic filter surfaces in which in a porous stainless steel substrate is impregnated with 0.2 to 1.0 micrometer sized $TiO_2$ particles to the porous metal.

U.S. Pat. No. 5,043,069, Brandon et al.

The patent is directed to a method for making a stable formed-in-place (FIP) saccharin, i.e., gum membrane on a porous support such as the one described in the above-referred second Gaddis patent.

Definitions

As used herein, the following terms have the meanings indicated below:

"Dilute suspension" refers to a dispersion of non-agglomerated finely divided solids in a liquid medium in which the concentration of such solids does not exceed 5,000 mg/L;

"Flux" refers to the volumetric rate of permeate flow per unit of superficial filter surface area in units of liters per square meter hour ($L/m^2hr$).

DETAILED DESCRIPTION OF THE INVENTION

Altered Substrate

The method of the invention can be used on a wide variety of altered substrates including both metals such as stainless steel, and ceramic materials. Porous structure of carbon or polymeric materials can also be used. Either low surface energy materials such as TELFON ® fluropolymers or high surface energy materials can be used. The precise composition of the substrate material is not critical so long as it possesses the proper degree of porosity, inertness with respect to the materials being processed and mechanical strength to withstand the mechanical stresses which are incident to normal filter operation and maintenance.

As is pointed out in the above-referred Gaddis' 114 patent, it is essential that the pores of the substrate be 0.5–10 micrometers in size in order to accommodate the particles within the pores prior to their being sintered. It is also preferred that the particle size of the substrate material be from 1 to 10 micrometers. If the particles are substantially more than 10 micrometers, the porous substrate tends to lose mechanical strength and is brittle. On the other hand, if the substrate particles are smaller than about 1 micrometer, it is difficult to obtain adequate impregnation of the solids and the pressure drop through the substrate is likely to be excessive.

Impregnation Solids

While it is preferred to use titanium oxide as the impregnating material, it will be recognized that other than metal oxides can be used e.g., polymer particles, $SiO_2$, metal, etc.

It is also essential that the size of the particles to be sintered is sufficiently small that they can readily be deposited within the substrate pores by treatment with slurries of the solids before they are sintered to the substrate particles.

For more efficient operation of the filter, the impregnating solids should be impregnated and sintered within the porous substrate to a depth of 30–100 micrometers and should be as evenly distributed as possible. If the depth of the sintered metal oxide is too low, it tends to be weak mechanically and if the depth is too high, the length-to-diameter ration of the paths through the substrate is too high and the pressure drop during operation of the filter tends to become excessively high as well.

Solids for Regeneration

It has been found that the solids to be used for regeneration need not be the same composition as the impregnation solids. Though the solids for regeneration may be the same, it is not necessary so long as the solids are inert with respect to the materials to be filtered and are reasonably resistant to abrasion. Furthermore, mixtures of various solids can be used as well.

The term "altered substrate filter" refers to a dimensionally stable porous solid filter substrate one surface of which has been impregnated with particulate solids which are affixed within the pores of the substrate. The method by which the solids are affixed within the pores of the substrate is not critical. For example, particle solids may be affixed by sintering of the particles, by sintering of the substrate material and/or by sintering of both the particles and the substrate material. A typical altered substrate is illustrated by the invention described and claimed in U.S. Pat. No. 4,888,114 to Gaddis et al. However, it has been found that the finely divided particles to be used for regeneration of the filter must be no larger than the particles used for the sintered oxide layer.

Thus, if the particle size of the sintered metal oxide was 0.5 micrometer, then the particle size of the solids to be used for regeneration must be no more than 0.5 micrometer and preferably should be less. Furthermore, it is essential that the particles be completely non-agglomerated. That is, they must consist of discrete and separate particles.

The finely divided solid particles are deposited on the sintered particles by treating the sintered layer with a very thin aqueous suspensions of the solid particles in order to obtain a uniform coating. It is preferred that the suspension contain 10 to 1000 mg/L of metal oxide, with from 50 to 500 mg/L being especially preferred.

Some materials such as metal oxides tend to become agglomerated in aqueous slurries even when the concentrations are quite dilute. Therefore, it is frequently needed to adjust the pH of the slurry, add a surfactant or make further chemical treatment to insure that the particles are essentially completely non-agglomerated. To illustrate, in the case of titanium dioxide particles, it is necessary to keep the pH of the slurry at or near the isoelectric point of the metal oxide particles. In the case of $TiO_2$, pH 8–12 is needed to maintain the particles in non-agglomerated form. Other methods of treatment to reduce particle charges and thus to assure de-agglomeration will be apparent to those skilled in the art when other metal oxides are used.

Treating Method

The method of the invention has quite surprisingly been found to be useful in raising the filter efficiency of both clean filters and filters which have been damaged by erosion and/or fouled by the deposition of various solid materials. Of even greater surprise was the discovery that the solids particles used to repair the damaged sintered solids do not themselves need to be sintered. They need only to be deposited within the sintered metal oxide layer in accordance with the above-noted criteria of the method of the invention.

In the case of filter systems which contain accumulated deposits, it is necessary to remove those materials as completely as possible and to carry on the regeneration method on clean substrate porous surfaces. In the case of water insoluble organic deposits such as fatty acids and insoluble proteins, treatment with dilute NaOH can be used to convert these materials to a water soluble form which can then be washed from the pores.

Upon completion of the pore cleaning operation, it may be desired to wash out the pores with reagent to adjust the pore surfaces to a pH such that no agglomeration will occur upon contact of the metal oxides particles during the treating step.

As stated above, it is essential that the particle size of the solids used for regeneration be no larger than the impregnated particles on the filter element. Moreover, so long as the regeneration particles meet this size criterion relative to the impregnated particles, either small or large sized particles may be used. Particles of 5–500 nanometers may therefore be used in the practice of invention. However, particles of 10–350 nanometers are preferred. It has been found that the use of small regeneration particles, e.g. 10–50 nanometers are significantly more effective than large sized particles, e.g. 100–500 nanometers. However, in the case of $TiO_2$ the smaller particles which are of rutile crystalline form are several times more expensive than the larger particles, which are of anatase crystalline form. Other oxides such as Ludox ® of the particle sizes indicated above are also suitable for use herein. Thus, it would be expected that the use solely of small particles would be preferred despite the higher cost. It has nevertheless been found that mixtures of large and small particles are substantially as effective as small particles along so long as the proportions of the large particles do not exceed 75% by weight and preferably no more than 60% by weight of the total particles.

It should be noted that neither the temperature nor the pressure of the treating operation is critical to the effectiveness of the treatment. Normally the operation is carried out with inlet and outlet pressures of about 130 and 70 psi respectively (9.0 and 4.8 bars).

To obtain adequate deposition of the solids for regeneration of the element, it will ordinarily be preferred to recirculate the treating suspension through the filter element until a volume five times the volume of the feed tank have passed through the filter as permiate.

EXAMPLES

The following examples were performed in a large scale industrial filter installation in which the feed to the filter was a syrup derived from corn starch enzymatically processed to free sugar. The purpose of the filtration operation was to remove unwanted organic substances in the syrup and to pass the liquid sugar product into the filtrate. These examples compare the average production rates of the several filter stages during typical 1-2 day filter cycles at the end of which the filter is cleaned and regenerated by the method of the invention.

Filtration stages A-G and stages H-L are each operated in series.

EXAMPLE 1

Stages H through K were operated in a comparable fashion for the first year after installation, and their average flux rates for the first month are listed. For all stages, the monthly averages in the last month of operation without $TiO_2$ particle deposition are compared with performance for the second month when 300 nanometers particles were deposited at the beginning of each operating cycle. For some of the stages, a cycle was carried out in the third month with 15 nanometers particles.

The 300 nanometer particles were Whittaker, Clark & Daniels No. 3330 anatase. The 15 nanometer particles were rutile $TiO_2$ from Daicolor Pope, Inc., Grade MT-150W from the same company. The 35 nanometer particles were rutile $TiO_2$ from Diacolor Pope, Inc., Grade MT500B. In these runs, an aqueous suspension containing 5.4 g $TiO_2/m^2$ was applied by pumping the suspension into the tubes at 80 psi (5.5 bars) without recirculation. The application of particles was from a slurry at about pH 10, at which the distribution is essentially as individual particles, rather than the agglomerates formed by pretreatment with acid and present when deposition is at acidic pH. Pressures over a stage range from about 120 to 50 psi (8.3-3.4 bars); temperature was about 60° C. during operation with the syrup.

TABLE I

| | Effect of Metal Oxide Treatment on average Flux for Each Filter Stage | | | |
|---|---|---|---|---|
| Period | Reference Month | First Test Month | Second Test Month | Third Test Month |
| $TiO_2$ Size, nm | None | None | 300 | 15 |
| Stage | | | | |
| A | 90.2 | 58.0 | 71.1 | |
| B | 80.1 | 60.1 | 74.3 | 106.2 |
| C | 94.8 | 62.2 | 79.4 | |
| D | 84.8 | 63.9 | 72.5 | 101.3 |
| E | 84.4 | 66.7 | 74.7 | 103.1 |
| F | 84.8 | 64.5 | 74.7 | |
| G | 70.8 | 48.7 | 62.6 | 85.2 |
| H | 96.5 | 68.0 | 105.6 | 141.2 |
| I | 114.2 | 70.2 | 100.4 | |
| J | 118.3 | 60.9 | 89.4 | 118.0 |
| K | 113.0 | 56.6 | 72.9 | 96.5 |
| L | | 95.1 | 108.9 | |
| Average | 93.8 | 64.6 | 82.2 | 107.4 |

| Period Stage | First Month v Reference Month % Change | Second Month v First Month % Change | Third Month v Second Month % Change |
|---|---|---|---|
| A | −36 | 23 | |
| B | −25 | 24 | 43 |
| C | −34 | 28 | |
| D | −25 | 13 | 40 |
| E | −21 | 12 | 38 |
| F | −24 | 16 | |
| G | −31 | 29 | 36 |
| H | −30 | 55 | 34 |
| I | −39 | 43 | |
| J | −49 | 47 | 32 |
| K | −50 | 29 | 32 |
| L | | 15 | |
| Average | −33 | 28 | 36 |

Stage L is not comparable to the other stages for the reason that it was a relatively recently installed addition and was operated with a gum membrane of the type described in U.S. Pat. No. 5,043,069. About 4.3 g/m² of particles was deposited at 60 psi before formation of the membrane. Stage L is included in the table to illustrate that benefits are also realized after relatively little exposure of the tubes even when a formed-in-place membrance used with the sintered metal oxide membranes.

From comparison of the fluxes in the first and second months, a substantial improvement in production rate from application of 300 nanometer $TiO_2$ after each cleaning cycle is apparent. The average increase overall for the installation was 28%. On use of 15 nanometer particles there was a dramatic increase of 36% over the improved production rate attained with 300 nanometer particles.

Modules H, I, J and K were run initially without membranes and allow comparison of performance before and after deterioration. The data in Table 1 show that treatment with 300 nanometer particles restored a substantial fraction of the original production and that subsequent treatment with 15 nanometer particles raised production above the initial values in the cases for which comparison can be made. These results indicate that improvements described here were accrued with new as well as deteriorated supports.

After the tests of 15 nanometer particles during the first week in the third month, operation the rest of the month was with 300 nanometer particles. After cycles employing particle additions, omission (or change to a less favorable particle) resulted in decay of production rate, but some residual benefit persists over several cycles. Consequently, in the following examples that illustrate effects of detailed variations, the results are presented chronologically and the direction of the effect of a change is more significant than the actual production rate, which is affected by the recent history of the stage. Because the results below are for single tests on single stages, rather than averages of many individual flux values, the uncertainties in the comparison base were reduced by selecting the six or seven runs in which the operation was best controlled with respect to the amount of 300 nanometer particles applied and the pressure. Their average is listed as the "Ref.". "Relative performance" in the examples refers to the ration of flux with coating in question to the reference without the coating.

EXAMPLE 2

Example 13 illustrates effects of the quantity of 15 nanometer particles/m² on Stage G, as well as substitution of 35 nanometer particles at low addition, in single-layer deposition. The results are reported in Tables 2 and 3.

TABLE 2

Effect of Particle Size on Effectiveness of Metal Oxide Treatment

| Particle Size, nm | Loading, g/m² | Average Flux, L/(m²hr) | Relative Performance |
| --- | --- | --- | --- |
| 300 | 10.8 | 53.2 | 1.00 |
| 15 | 2.7 | 55.0 | 1.03 |
| 15 | 2.7 | 70.4 | 1.24 |
| 15 | 5.4 | 77.3 | 1.46 |
| 15 | 5.4 | 78.0 | 1.47 |
| 35 | 2.7 | 69.0 | 1.30 |
| 35 | 2.7 | 58.3 | 1.10 |
| 15 | 10.8 | 63.9 | 1.20 |

TABLE 3

Effect of High and Low Particle Sizes Applied On Effectiveness of metal Oxide Treatment

| 300 $TiO_2$ Loading (g/m²) | 35 | 15 | Av. Flux L/(m²hr) | Relative Performance |
| --- | --- | --- | --- | --- |
| Ref. 10.8 | 0 | 0 | 100.4 | 1.00 |
| 8.1 | 0 | 2.7 | 99.5 | 0.99 |
| 8.1 | 0 | 2.7 | 98.6 | 0.98 |
| 8.1 | 0 | 2.7 | 101.3 | 1.01 |
| 5.4 | 0 | 5.4 | 113.4 | 1.18 |
| 5.4 | 0 | 5.4 | 124.6 | 1.24 |
| 5.4 | 5.4 | — | 104.0 | 1.04 |
| | | 21.6 | 92.3 | 0.92 |

EXAMPLE 3

This example illustrates the effect of more than one particle size, the deposition being from a mixture. These tests were carried out on Stage I. The results are reported in Table 4.

TABLE 4

Effect of Mixed High and Low Particle Sizes On Effectiveness of Metal Oxide Treatment

| 300 $TiO_2$ Loading (g/m²) | 35 | 15 | Av. Flux L/(m²hr) | Relative Performance |
| --- | --- | --- | --- | --- |
| Ref. 10.8 | 0 | 0 | 99.8 | 1.00 |
| 4.0 | 0 | 1.3 | 110.9 | 1.11 |
| 4.0 | 0 | 1.3 | 108.7 | 1.09 |
| 4.0 | 0 | 1.3 | 110.8 | 1.11 |
| 2.7 | 0 | 2.7 | 130.1 | 1.30 |
| 2.7 | 0 | 2.7 | 144.1 | 1.44 |
| 2.7 | 2.7 | 21.6 | 116.2 | 1.16 |
| | | | 102.0 | 1.07 |

Comparison of Tables 3 and 4 indicates that performance is more enhanced with more than one particle size if the particles are deposited from mixtures, rather than in successive layers. Tables 2–4 all imply improvement when 15 nanometer particles are a substantial component in the deposition. In all cases when amounts were comparable, 35 nanometer particles gave less favorable production rates than 15, although the intermediate size does improve performance over the reference with 300 nanometer particles alone. In the separate layers of Example 3, the fraction of 15 nanometer particles had to be half the 10.8 g/m² total for improvement over the reference. In the mixtures of Example 4, increasing the fraction of 15 nanometer particles improved performance. There appears to be little benefit from increasing 15 nanometer deposition to more than 5.4 g/m² and raising the amount/unit area even higher appears detrimental Comparison of Tables 2 and 4 indicates enhancement of rates (44 to 47%) by depositions of 5.4 g/m² total are essentially as high when half is 15 and half is 300 nanometers as when all is 15, an important factor in view of the much higher cost of the smaller particles.

EXAMPLE 4

Example 4 illustrates similar benefits from 15 nanometer particles when used in conjunction with gum membranes on Stage L. The results are reported in Table 5.

TABLE 5

| Effect of Metal Oxide Treatment on Filter with Gum Membrane | | | |
|---|---|---|---|
| 300 TiO$_2$ Loading (g/m$^2$) | 15 | Av. Flux L/(m$^2$hr) | Relative Performance |
| 4.3 | 0 | 111.8 | 1.00 |
| 0 | 3.2 | 125.8 | 1.13 |
| 0 | 5.4 | 136.5 | 1.22 |

We claim:

1. A method for improving the filtration efficiency of any altered substrate filter element comprising a porous solid substrate having a pore size of 0.5–10 micrometers, the pores in one surface of which are impregnated to a depth of 30–100 micrometers with a sintered material having an average particle size of 5 to 500 nanometers, comprising treating the side of the filter element containing the sintered materials free of foulants, with a dilute suspension of non-agglomerated finely divided solid particles dispersed in an aqueous liquid medium, the size of the non-agglomerated particles being no greater than the size of the impregnated sintered solids, to effect separation of the finely divided solid particles from the aqueous liquid medium and deposition of the non-agglonerated, finely divided solid particles from the dilute suspension thereof on the sintered material particles in the pores of the porous solid substrate to a level of 1.08–54 g/m$^2$.

2. The method claim 1 in which the efficiency of the filter has been impaired by abrasion of the impregnated solids and the deposition of organic foulant within the pores and, before treatment the foulant is removed from the pores of the filter and the pores are washed.

3. The method of claim 2 in which the average particle size of the solid particles in the aqueous medium is 5–500 nanometers.

4. The method of claim 3 in which the aqueous medium contains from 10 to 1000 mg/L solid particles which particles are formed of a metal oxide.

5. The method of claim 4 in which the slurry contains an admixture of no more than 75% by weight larger particles and no less than 25% by weight smaller particles, the size ratio of the particles being at least 10:1, respectively.

6. The method of claim 5 in which the solid particles in the dilute suspension are made of titanium dioxide.

7. The method of claim 6 in which the pH of the aqueous liquid medium 8–12.

8. The method of claim 7 in which the porous solid substrate is formed of sintered stainless particles.

9. The method of claim 8 in which a formed-in-place hyperfiltration membrane is applied over the treated side of the filter element.

* * * * *